United States Patent [19]
Toro

[11] 3,967,222
[45] June 29, 1976

[54] DISTRIBUTED RESISTANCE-CAPACITANCE COMPONENT

[75] Inventor: Joseph A. Toro, Ogallala, Nebr.

[73] Assignee: TRW Inc., Los Angeles, Calif.

[22] Filed: May 27, 1975

[21] Appl. No.: 581,156

[52] U.S. Cl. .............................. 333/70 CR; 317/256; 333/79
[51] Int. Cl.² ........................ H03H 7/06; H01G 4/40
[58] Field of Search ................. 333/70 R, 79, 31 C, 333/31 R, 70 CR; 317/256, 260, 242

[56] References Cited
UNITED STATES PATENTS

| | | | |
|---|---|---|---|
| 2,016,303 | 10/1935 | Sprague | 333/79 |
| 2,440,652 | 4/1948 | Beverly | 333/31 C |
| 2,526,321 | 10/1950 | Beverly | 317/260 X |
| 2,537,959 | 1/1951 | Beverly | 333/31 C |
| 2,884,605 | 4/1959 | Dubilier | 317/260 X |
| 3,609,600 | 9/1971 | Kassabgi | 333/31 R |
| 3,786,322 | 1/1974 | Brown et al. | 317/256 |
| 3,859,592 | 1/1975 | Kessler | 317/256 X |

*Primary Examiner*—Alfred E. Smith
*Assistant Examiner*—Marvin Nussbaum
*Attorney, Agent, or Firm*—Poms, Smith, Lande & Glenny

[57] ABSTRACT

A distributed resistance-capacitance component formed of windings of dielectric films having patterns of metallized layers formed thereon with margins shaped to provide a distributed resistance along the metallized layers and capacitance between the metallized layers on opposite sides of the dielectric films. Electrodes and leads are secured at opposite ends of the wound coil by metal spraying or schooping.

15 Claims, 6 Drawing Figures

U.S. Patent   June 29, 1976   3,967,222
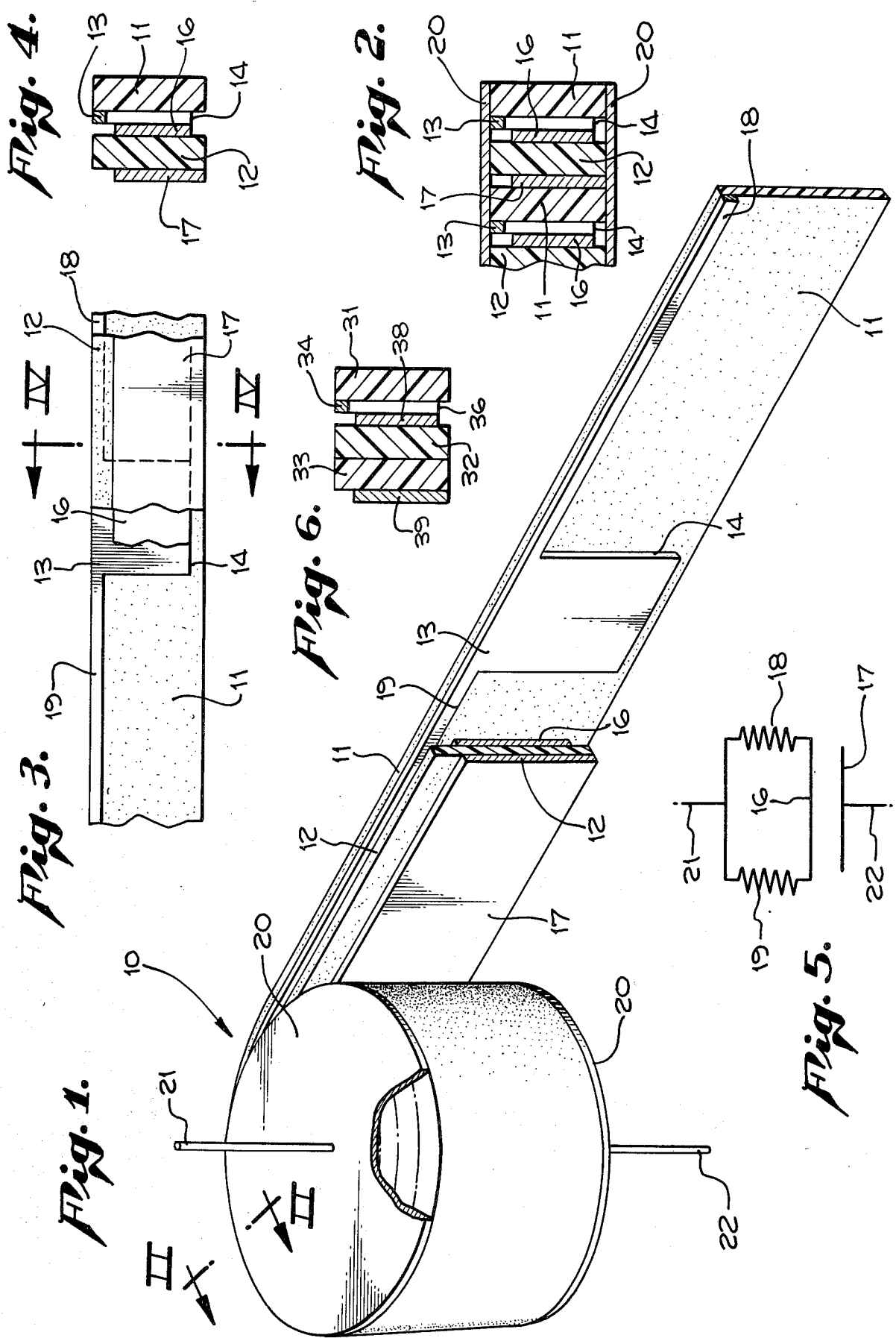

DISTRIBUTED RESISTANCE-CAPACITANCE COMPONENT

BACKGROUND OF THE INVENTION

The present invention relates to a distributed resistance-capacitance component and more particularly to an electrical component for providing resistance and capacitance formed of wound layers of dielectric film having layers of resistive metal formed in patterns thereon to provide a resistance-capacitance component.

Various prior art resistance-capacitance components are formed of discrete resistors and discrete capacitors connected in series and/or parallel to provide the desired network. These prior art devices are typically used to protect relay contacts by dampening, ringing and chattering.

These prior art components are relatively large in size and the assembly of these components is generally time-consuming and therefore costly. The networks provide lumped resistance and capacitance such that the malfunction of one resistor or capacitor may render the network entirely inoperative. Thus, such networks are susceptible to short circuit problems and the performance of them is generally unreliable.

SUMMARY OF THE INVENTION

The present invention provides a distributed resistance-capacitance component formed of windings of dielectric films with metallized layers thereon. The layers are in patterns of resistive metal such as aluminum or zinc which is deposited thereon by conventional techniques such as evaporation or sputtering. The geometry of the patterns provides distributed resistance with margins along the metallized layers and capacitance on opposite sides of the dielectric films to provide the distributed resistance-capacitance network. The component is formed of predetermined combinations of simplex and duplex dielectric films. A simplex dielectric film has a metallized layer on one side. A duplex dielectric film has metallized layers on both sides.

One embodiment is formed of a simplex dielectric film juxtaposed against a duplex dielectric film to provide two parallel distributed resistors in series with a capacitor. The simplex dielectric film has a metallized portion in the shape of a "T" with the vertical leg of the "T" forming a contact pad and the arms of the "T" providing distributed resistance.

The duplex dielectric film is metallized on both sides with proper margin widths so that when it is in juxtaposition with the simplex film, the component provides proper resistance and capacitance without shorting out the metallized layer of the duplex film which is in contact with the metallized layer contact pads of the simplex film. This embodiment is particularly advantageous in that it is simple to wind.

In another embodiment, the component may be formed of three simplex dielectric films juxtaposed against each other. A first simplex dielectric film has a metallized layer in the shape of a "T" having two arms for providing distributed resistance and a leg perpendicular to the arms with the leg being rectangular in shape for providing a contact pad. The second and third simplex dielectric films each have metallized layers on the outsides. The contact pad of the first film is juxtaposed against one metallized layer of the second simplex film. The second metallized layer has a margin to form an electrical connection with the contact pad without being electrically connected to the arms of the "T". This embodiment is particularly advantageous in that it provides ease of masking of the second and third simplex films during metallization.

Accordingly, an object of the present invention is to provide a distributed resistance-capacitance component.

Still another object is to provide a resistance-capacitance component having improved reliability and performance.

Yet another object of the present invention is to provide a circuit component means which is relatively small in size and requires a relatively small amount of labor to manufacture.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of one embodiment of the component of the present invention in partially wound form;

FIG. 2 is a cross-sectional view of the component of FIG. 1 taken along the plane II—II.

FIG. 3 is an elevation view of a section of the winding of the component of FIG. 1;

FIG. 4 is a cross sectional view taken along the plane IV—IV of FIG. 3;

FIG. 5 is a schematic diagram of the component of the present invention; and

FIG. 6 is a cross-sectional view of an alternative embodiment of the component of the present invention.

DESCRIPTION OF THE PREFERRED EMBODIMENT

Referring now to FIG. 1, there is shown an embodiment of the wound component 10 of the present invention formed of a first simplex dielectric film 11 and a second duplex dielectric film 12 juxtaposed against each other. The simplex film has a single metallized layer 13 and the duplex film has two metallized layers 16 and 17. The geometry of the metallized layers provides distributed resistance along each of the metallized layers and capacitance between preselected metallized layers. This embodiment provides the feature of ease in winding the component.

The metallized layer 13 of the simplex film 11 is in the shape of a "T" having resistance arms 18 and 19 for providing distributed resistance with a rectangular leg portion perpendicular to the arms forming a contact pad 14. The metallized layers 16 and 17 of the duplex film 12 are formed with the proper margin to provide capacitance and an electrical connection with contact pad 14 without shorting out the arms 18 and 19 of the metallized layer 13.

The arms 18 and 19 of the "T" shaped metallized layer 13 provide distributed resistance as shown in the schematic diagram of FIG. 5. The opposite metallized layers 16 and 17 of the duplex dielectric film 12 provide the opposite plates of a capacitive element as also shown in FIG. 5.

The dielectric films may be convoluted by juxtaposing them together and winding them up to form the cylindrical component 10 as shown in FIG. 1 having a cross-section as shown in FIG. 2. The ends of the cylinder may be sprayed in a manner well known in the art with molten metal to form electrodes 20 as shown in FIG. 2 with leads 21 and 22 bonded thereto. This process is sometimes referred to as schooping. The lead 21 may be thereby connected to the arms 18 and 19 and the lead 22 may be thereby connected to the metallized layer 17 to provide terminals for the component.

In an alternative embodiment shown in cross-sectional view in FIG. 6, the component is formed of three simplex dielectric films 31, 32 and 33. The first film 31 is identical to the simplex film 11 shown in FIGS. 1 through 4 and the second and third simplex films 32 and 33 are collectively identical to the duplex dielectric film 12 shown in FIGS. 1 through 4. This embodiment is particularly advantageous in that it provides ease of masking of the simplex dielectric films 32 and 33 during metallization.

The simplex film 31 has a metallized layer 34 in the shape of a "T" having arms for providing distributed resistance and a rectangular leg portion perpendicular to the arms forming a contact pad 36. The simplex films 32 and 33 have metallized layers 38 and 39 respectively with the metallized layers having proper margins as shown to provide capacitance and an electrical connection with the contact pad 36 without being electrically connected to the resistance arms to thereby prevent shorting out of the arms of the metallized layer 34.

The arms of the "T" shaped metallized layer 36 provide distributed resistance as shown in the schematic diagram of FIG. 5. The opposite metallized layers 38 and 39 of the two simplex dielectric films 32 and 33 respectively provide the opposite plates of a capacitive element as also shown in FIG. 5.

The dielectric films may be convoluted by juxtaposing them together and winding them up to form a cylindrical component as shown in FIG. 1. The ends of the cylinder may be sprayed in a manner well known in the art to form electrodes with leads bonded thereto.

The film used in the present invention may be formed of any suitable material having a high dielectric strength such as polystyrene, polycarbonate or polyester terephthalate (Mylar). The dielectric can be in the order of 0.08 to 1.0 mils thick and may be metallized by any standard technique such as vapor deposition, sputtering or spraying.

The metallized layer is formed to be sufficiently thin in the order of 2 to 3 millionths of an inch thick, so as to provide the predetermined amount of distributed resistance. The metal may be any suitable conductor such as aluminum or zinc.

Obviously many modifications and variations of the present invention are possible in light of the above teachings. It is therefore to be understood that within the scope of the appended claims, the invention may be practiced otherwise than as specifically described.

I claim:

1. A convoluted distributed resistance-capacitance component comprising:
    a plurality of wound dielectric films juxtaposed against each other including at least one duplex film having metallized layers on surfaces of both sides and at least one simplex film having a metallized layer on only one surface with said metallized layer on said simplex film being in direct contact with one of said metallized layers on said duplex film, said metallized layers being geometrically shaped with margins to provide distributed resistance along each of said metallized layers and capacitance between each of said metallized layers, and
    lead means coupled to each of said metallized layers to provide electrical input and output terminals to thereby provide a component having resistance provided by said distributed resistance along each of said metallized layers and capacitance provided between each of said metallized layers.

2. A convoluted distributed resistance-capacitance component comprising:
    a plurality of wound dielectric films juxtaposed against each other including at least one duplex film having metallized layers on surfaces of both sides and at least one simplex film having a "T" shaped metallized layer on only one surface with said "T" shaped metallized layer having two arms for providing distributed resistance and a leg perpendicular to said arms, said leg being rectangular in shape for providing a contact pad, each of said metallized layers being geometrically shaped with margins to provide distributed resistance along each of said metallized layers and capacitance between each of said metallized layers, and
    lead means coupled to each of said metallized layers to provide electrical input and output terminals to thereby provide a component having resistance provided by said distributed resistance along each of said metallized layers and capacitance provided between each of said metallized layers.

3. The component as described in claim 2 and wherein said duplex film has a metallized layer on one surface juxtaposed against said metallized layer of said simplex film with said first metallized layer on said one surface of said duplex film having margins of sufficient width so as to form an electrical connection with said contact pad without being electrically connnected to said arms.

4. The component as described in claim 3 and wherein said duplex film has a metallized layer on the second surface having a margin formed to provide capacitance between said metallized layers on the surfaces of both sides to provide capacitance between said metallized layers on the surfaces of said duplex dielectric film without shorting out the distributed resistance along the arms of said "T" shaped metallized layer of said simplex film.

5. The component as described in claim 4 and wherein said lead means includes an electrical lead connected to the second surface of said duplex layer and a pair of electrical leads each connected to one arm of said two arms of said "T" shaped layer to thereby provide an electrical component having a capacitor connected in series with the pair of distributed resistors in parallel.

6. A convoluted distributed resistance-capacitance component comprising:
    a plurality of wound dielectric films juxtaposed against each other including three simplex dielectric films,
    at least one metallized layer formed on the surface of each of said dielectric films with each of said metallized layers being geometrically shaped with margins to provide distributed resistance along each of said metallized layers and capacitance between each of said metallized layers with said metallized layer on the first simplex film of said three simplex dielectric films being "T" shaped and having two arms for providing distributed resistance and a leg perpendicular to said two arms, said leg being rectangular in shape for providing a contact pad, and lead means coupled to each of said metallized layers to provide electrical input and output terminals to thereby provide a component having resistance provided by said distributed resistance along each of said metallized layers and capacitance provided between each of said metallized layers.

7. The component as described in claim 6 and wherein the second and third simplex films of said three simplex dielectric films each has a metallized layer on its respective outside surface with said metallized layer of said first simplex film juxtaposed against the second metallized layer of said second simplex film with said second metallized layer on the surface of said second simplex film having a margin of sufficient width so as to form an electrical connection with said contact pad without being electrically connected to said arms.

8. The component as described in claim 7 and wherein said third simplex film has a metallized layer having a margin formed to provide capacitance between said metallized layers to provide capacitance between said metallized layers on the surfaces of said second and third simplex films without shorting out the distributed resistance along the arms of said "T" shaped metallized layer of said first simplex film.

9. The component as described in claim 8 and wherein said lead means includes an electrical lead connected to the metallized layer of said third simplex dielectric film and a pair of electrical leads, each connected to one arm of said two arms of said "T" shaped layer on said first simplex dielectric film to thereby provide an electrical component having a capacitor connected in series with the pair of resistors in parallel.

10. A wound resistance-capacitance component formed of a pair of dielectric films juxtaposed together comprising:
a "T" shaped metallized layer formed on one side of one of said dielectric films, said "T" having a pair of arms for providing distributed resistance and a leg perpendicular to said arms, said leg being rectangular in shape for providing a contact pad,
a first metallized layer on one side of said second dielectric film, said first metallized layer having a margin whereby said first metallized layer is positioned to be in contact with said contact pad without contacting said pair of arms, and
a second metallized layer on the other side of said second dielectric film, said second metallized layer having a margin formed to avoid a short circuit with said first metallized layer.

11. The component as described in claim 10 and further including lead means connected to said wound dielectric films to provide a first terminal coupled to the arms of said "T" shaped metallized layer and a second terminal coupled to said second metallized layer.

12. A wound resistance-capacitance component formed of three simplex dielectric films juxtaposed against each other comprising:
a first metallized layer formed on the surface of the first of said three simplex dielectric films,
a second metallized layer formed on the second of said three simplex dielectric films, said second metallized layer juxtaposed against said first metallized layer to form an electrical connection therewith,
a third metallized layer formed on the third of said three simplex dielectric films, and
lead means having a first and second terminal with one terminal electrically coupled to said first metallized layer and the second terminal coupled to said third metallized layer to provide distributed resistance along each of said metallized layers in series with capacitance between said second and third metallized layers.

13. The components as described in claim 12 and wherein said first metallized layer is "T" shaped having two arms for providing distributed resistance and a leg perpendicular to said arms, said leg being rectangular in shape for providing a contact pad.

14. The component as described in claim 13 and wherein said second metallized layer has a margin so as to form an electrical connection with said contact pad without being electrically connected to said arms.

15. The component as described in claim 14 and wherein said first metallized layer provides distributed resistance in series with capacitance between said second and third metallized layers.

* * * * *